Oct. 30, 1956 E. HUGEL ET AL 2,768,747
APPARATUS FOR BLEACHING FATTY MATERIALS
Filed Jan. 22, 1952

FIG. 3      FIG. 2

INVENTORS
Ernst Hugel and Hans Spangenberg
BY Michael S. Striker Agt.

# United States Patent Office 2,768,747
Patented Oct. 30, 1956

2,768,747

APPARATUS FOR BLEACHING FATTY MATERIALS

Ernst Hugel, Hamburg-Altona, and Hans Spangenberg, Berlin, Germany, assignors to Pintsch Bamag Aktiengesellschaft Application January 22, 1952, Serial No. 267,665

Claims priority, application Germany July 21, 1951

10 Claims. (Cl. 210—42.5)

The present invention relates to the bleaching of fatty materials, that is to say of fats and oils.

It is known that mineral oils can be bleached in a continuous process by adding a bleaching earth in the dry state and in the required quantity to the mineral oil, the bleaching earth being filtered out from the mineral oil after the bleaching has been effected under heat. Vegetable and animal fats and oils, however, have hitherto been bleached in a step-by-step process.

It is an object of the present invention to provide an improved apparatus for bleaching fats and oils in a continuous process.

It is a further object of the invention to provide a means for bleaching fats and oils in a continuous process, which means may be used not only for bleaching mineral oils and fats, but also, and preferably, for bleaching vegetable and animal fats and oils.

Further objects and advantages of the invention will become apparent to those skilled in the art from the following description when read in conjunction with the appended drawings, in which:

Fig. 2 is a vertical section through a mixing apparatus used; and

Fig. 3 is a vertical section through a bleaching apparatus used.

The invention is based on the idea of initiating the bleaching process by continuously adding to the fat or oil to be treated a bleaching paste comprising a bleaching earth the amount of which corresponds to the amount of the fat or oil to be bleached, and then bleaching the fat or oil under reduced pressure, after the fat or oil has been intimately mixed with the paste of bleaching earth in a bleaching apparatus provided with heating and stirring devices, the fat or oil being subsequently conducted from said bleaching apparatus to at least two filtering devices, for example filtering presses or centrifugal devices, which operate alternately in such a manner that after one of the filtering devices has become filled with material filtered out of the bleached fat or oil another filtering device is automatically rendered operative, whereby to effect a continuous removal of the bleaching earth from the bleached fat or oil.

For continuously conducting the fat or oil comprising an appropriate amount of bleaching earth to the bleaching apparatus, at least two mixing apparatus may be provided for preparing the paste of bleaching earth, the paste being alternately conducted from one or another of the mixing apparatus to the fat or oil to be bleached, a measuring device being preferably provided in the path of the paste from the mixing apparatus to the fat or oil for controlling the amount of paste to be added to the fat or oil. After the bleaching of the fat or oil has been effected in the bleaching apparatus, the bleached fat or oil is conducted to one of the filtering devices. Preferably, two filtering devices are provided which are operated alternately, the switching over from one filtering device to the other for removing the bleaching earth contained in the bleached fat or oil being effected by control means which act automatically, for example, in response to an increase of the pressure existing in a feed pipe leading to the filtering devices, the increase of pressure in the feed pipe being caused by the respective filtering device becoming filled with material filtered out from the bleached fat or oil.

Figure 1:
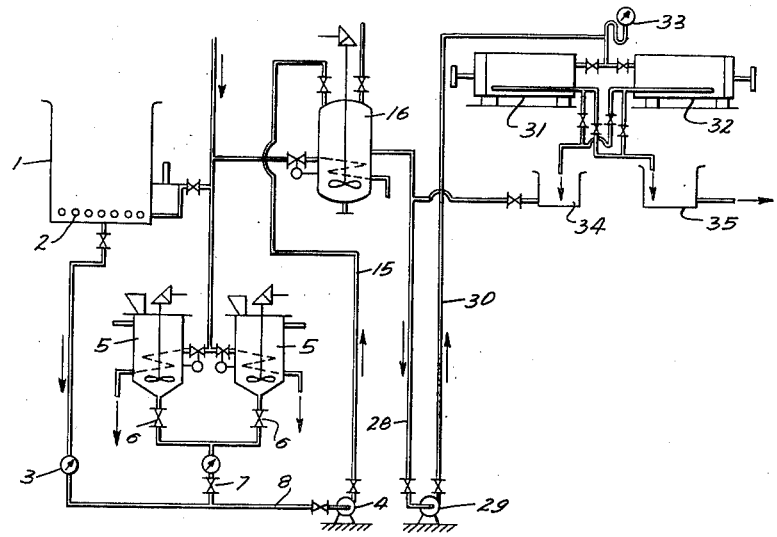
Fig. 1 is a diagram for explaining a specific embodiment of the invention.
Figure 1:
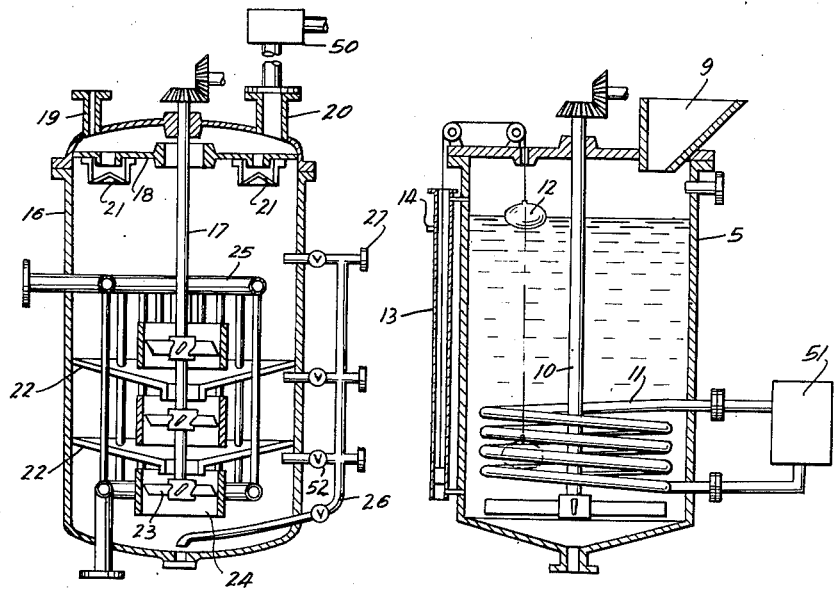

In the arrangement illustrated in Fig. 1, oil (which term shall embrace a liquefied fat) is contained in a container 1 and is kept at a constant temperature by an adjustable heating device 2. The oil flows from the container 1 through a measuring device 3 and a duct 8 to a mixing pump 4. Two mixing apparatus 5 serve for preparing a paste of bleaching earth, each mixing apparatus 5 being connected across a valve member 6 and a measuring device 7 to the duct 8 leading to the mixing pump 4. The bleaching earth is added to oil contained in the mixing apparatus 5 through a filling funnel 9 (see also Fig. 2), and intimate mixing of the bleaching earth with the oil in each container to form the paste is effected by a stirring device 10. In the lower part of the mixing apparatus, a heating device 11 operatively connected with heating means 51 is provided. In order to prevent interruption of the continuous flow of the paste of bleaching earth to the duct 8 and thence to the mixing pump 4, there is provided in each mixing apparatus 5 a suitable signalling device, which in the embodiment illustrated comprises a float 12, the position of which in the mixing apparatus 5 is recognizable by means of an indicating device 13 leading to the outside of the mixing apparatus and arranged for contacting a contact member 14. As soon as the indicating device 13 shows that the respective mixing apparatus 5 is nearly empty, the other mixing apparatus 5, which also is provided with oil, is started to operate after the bleaching earth has been added through its filling funnel 9, while the first mixing apparatus is rendered inoperative and re-filled with oil. The paste of bleaching earth prepared in the respective mixing apparatus 5 reaches through the duct 8 the mixing pump 4 by which it is intimately mixed to the oil to be bleached and is fed through a duct 15 to bleaching apparatus 16.

The bleaching apparatus 16 comprises a container 16 in which a stirring device generally indicated by reference numeral 17 is provided (see also Fig. 3). In the interior of the container 16 and near its top a partition wall 18 is provided onto which the oil to be bleached is fed through an inlet tube 19. The moisture contained in the oil and in the bleaching eath is removed by an exhaust plant (or vacuum pump 50) communicating through a tube 20 with the interior of the container, to create therein a reduced pressure. The mixture of oil and bleaching earth liberated from the moisture then enters through distributing screens 21 the space of the container below the partition wall 18 in which the bleaching is effected. The space below the partition wall 18 of the interior of the container is sub-divided into storeys by further partition walls 22 arranged at different levels, each having preferably a conical shape, the apices of the cones being directed downwards. Above each of the further partition walls 22, stirring blades 23 connected to a common shaft of the stirring device 17 are provided, the blades 23 acting somewhat similarly to propellers and being each surrounded by a guide tube 24. For controlling the temperature of the oil while being bleached, a heating device 25 is provided in the container through which device heating steam can be fed. Of course, any other suitable heating device may be employed.

Depending on the kind of oil to be bleached a longer or shorter time is required during which the oil remains in the bleaching apparatus 16. In order to enable a variation of this time in a simple manner, a plurality of outlet tubes 27 are arranged on a common outlet pipe 26 at different levels, whereby the oil may be taken off with the desired degree of bleaching from one of the outlet tubes 27 which is appropriate in a specific case. A valve 52 is provided in each outlet tube 27 for controlling the flow of bleached oil therethrough. The bleached oil flowing out of the outlet pipe 26 and the respective outlet tube 27 is conducted through a duct 28 (see Fig. 1) to a filtering-press pump 29, which impels the oil to flow through a duct 30 to one of two filtering presses 31 and 32 operating alternately. When one of the filtering presses, say the filtering press 31, has been sufficiently filled with material filtered out of the oil, the pressure in the duct 30 increases correspondingly and operates a pressure-responsive control means 33, which may, for example, operate an electric contact, whereby the respective filtering press, in the example the filtering press 31, is automatically disconnected from the duct 30 and may be cleaned, while the other filtering press, in the example the filtering press 32, is automatically connected to the duct 30, so that the oil now reaches the said other filtering press in which it is now being filtered. The oil flowing out first from each filtering press is muddy oil and is collected in a container 34 for muddy oil, while the oil flowing out subsequently and being clean is collected in a container 35 for clean oil.

It should be clearly understood that the embodiment described and illustrated is given by way of example only. Many modifications, additions and omissions are possible without departing from the spirit of the invention.

We claim:

1. In an apparatus for continously bleaching liquid fatty material, in combination, a plurality of intermittently operable paste forming means each separately operated for providing batches of bleaching paste at spaced time intervals; a continuously operable mixing means; means for transferring from said plurality of intermittently operable paste forming means batches of bleaching paste in sequential order from one of said paste forming means after the other in such a manner that the admission of said bleaching paste to said continuously operable mixing means is substantially continuous; means for continuously introducing into said mixing means the liquid fatty material to be bleached whereby said bleaching paste and said liquid fatty material are continuously mixed in said mixing means; continuous bleaching means connected to said mixing means for continuously receiving and bleaching the mixture of the bleaching paste and the liquid fatty material from said mixing means; and filter means connected with said bleaching means for receiving and filtering said bleached liquid fatty material.

2. In an apparatus for continuous bleaching liquid fatty material, in combination, a plurality of intermittently operable paste forming means each separately operated for providing batches of bleaching paste at spaced time intervals; a continuously operable mixing means; means for transferring from said plurality of intermittently operable paste forming means batches of bleaching paste in sequential order from one of said paste forming means after the other in such a manner that the admission of said bleaching paste to said continuously operable mixing means is substantially continuous; means for continuously introducing into said mixing means the liquid fatty material to be bleached whereby said bleaching paste and said liquid fatty material are continuously mixed in said mixing means; continuous bleaching means connected to said mixing means for continuously receiving and bleaching the mixture of the bleaching paste and the liquid fatty material from said mixing means; a plurality of intermittently operable filter means, each separately operable for filtering at spaced intervals batches of said bleached mixture of bleaching paste and liquid fatty material; and means for transferring from said bleaching means to said plurality of filter means in sequential order to one of said filter means after the other, batches of bleached mixture of bleaching paste and liquid fatty material, thereby enabling filtering of said bleached mixture of bleaching paste and liquid fatty material continuously delivered from said bleaching means by said intermittently operable filter means.

3. In an apparatus for continuously bleaching liquid fatty material, in combination, a plurality of intermittently operable paste forming means each separately operated for providing batches of bleaching paste at spaced time intervals; a continuously operable mixing means; means for transferring from said plurality of intermittently operable paste forming means batches of bleaching paste in sequential order from one of said paste forming means after the other in such a manner that the admission of said bleaching paste to said continuously operable mixing means is substantially continuous; means for continuously introducing into said mixing means the liquid fatty material to be bleached whereby said bleaching paste and said liquid fatty material are continuously mixed in said mixing means; continuous bleaching means connected to said mixing means for continuously receiving and bleaching the mixture of the bleaching paste and the liquid fatty material from said mixing means; a plurality of intermittently operable filter means, each separately operable for filtering at spaced intervals batches of said bleached mixture of bleaching paste and liquid fatty material; means for transferring from said bleaching means to said plurality of filter means in sequential order to one of said filter means after the other, batches of bleached mixture of bleaching paste and liquid fatty material; and pressure responsive means operable in dependence on the pressure produced by said bleached mixture in the respective filter means for alternately operatively connecting each filter means to said transferring means, thereby enabling filtering of said bleached mixture of bleaching paste and liquid fatty material continuously delivered from said bleaching means by said intermittently operable filter means.

4. In an apparatus for continuously bleaching liquid fatty material, in combination, a plurality of intermittently operable paste forming means each separately operated for providing batches of bleaching paste at spaced time intervals, each paste forming means including a vessel in which the bleaching paste is formed and from which the bleaching paste is withdrawn for mixing with the liquid fatty material, and including indicating means for indicating the level of the bleaching paste in each vessel; a continuously operable mixing means; means for transferring from said plurality of intermittently operable paste forming means batches of bleaching paste in sequential order from one of said paste forming means after the other in such a manner that the admission of said bleaching paste to said continuously operable mixing means is substantially continuous; means for continuously introducing into said mixing means the liquid fatty material to be bleached whereby said bleaching paste and said liquid fatty material are continuously mixed in said mixing means; continuous bleaching means connected to said mixing means for continuously receiving and bleaching the mixture of the bleaching paste and the liquid fatty material from said mixing means; and filter means connected with said bleaching means for receiving and filtering said bleached liquid fatty material.

5. In an apparatus for continuously bleaching liquid fatty material, in combination, a plurality of intermittently operable paste forming means each separately operated for providing batches of bleaching paste at spaced time intervals; a continuously operable mixing means; means for transferring from said plurality of intermittently operable paste forming means batches of bleaching paste in sequential order from one of said paste forming means after the other in such a manner that the admission of said bleaching paste to said continuously operable mixing means is substantially continuous; means for continuously introducing into said mixing means the liquid fatty material to be bleached whereby said bleaching paste and said liquid fatty material are continuously mixed in said mixing means; continuous bleaching means connected to said mixing means for continuously receiving and bleaching the mixture of the bleaching paste and the liquid fatty material from said mixing means, said bleaching means comprising a plurality of communicating superimposed bleaching chambers each adapted to contain said mixture, the liquid fatty material contained in said mixture being bleached in each successive bleaching chamber in downward direction to a higher degree than in the preceding bleaching chamber, said bleaching means having outlet means for withdrawing the bleached mixture at will from any one of said bleaching chambers; a plurality of intermittently operable filter means, each separately operable for filtering at spaced intervals batches of said bleached mixture of bleaching paste and liquid fatty material; and means for transferring from said bleaching means to said plurality of filter means in sequential order to one of said filter means after the other, batches of bleached mixture of bleaching paste and liquid fatty material, thereby enabling filtering of said bleached mixture of bleaching paste and liquid fatty material continuously delivered from said bleaching means by said intermittently operable filter means.

6. In an apparatus for continuously bleaching liquid fatty material, in combination, a plurality of intermittently operable paste forming means each separately operated for providing batches of bleaching paste at spaced time intervals; a continuously operable mixing means; means for transferring from said plurality of intermittently operable paste forming means batches of bleaching paste in sequential order from one of said paste forming means after the other in such a manner that the admission of said bleaching paste to said continuously operable mixing means is substantially continuous; means for continuously introducing into said mixing means the liquid fatty material to be bleached whereby said bleaching paste and said liquid fatty material are continuously mixed in said mixing means; continuous bleaching means connected to said mixing means for continuously receiving and bleaching the mixture of the bleaching paste and the liquid fatty material from said mixing means; means for producing a reduced pressure in said bleaching means; a plurality of intermittently operable filter means, each separately operable for filtering at spaced intervals batches of said bleached mixture of bleaching paste and liquid fatty material; and means for transferring from said bleaching means to said plurality of filter means in sequential order to one of said filter means after the other, batches of bleached mixture of bleaching paste and liquid fatty material, thereby enabling filtering of said bleached mixture of bleaching paste and liquid fatty material continuously delivered from said bleaching means by said intermittently operable filter means.

7. In an apparatus for continuously bleaching liquid fatty material, in combination, a plurality of intermittently operable paste forming means each separately operated for providing batches of bleaching paste at spaced time intervals; a continuously operable mixing means; means for transferring from said plurality of intermittently operable paste forming means batches of bleaching paste in sequential order from one of said paste forming means after the other in such a manner that the admission of said bleaching paste to said continuously operable mixing means is substantially continuous; means for continuously introducing into said mixing means the liquid fatty material to be bleached whereby said bleaching paste and said liquid fatty material are continuously mixed in said mixing means; continuous bleaching means connected to said mixing means for continuously receiving and bleaching the mixture of the bleaching paste and the liquid fatty material from said mixing means, said bleaching means comprising a plurality of communicating superimposed bleaching chambers each adapted to contain said mixture, the liquid fatty material contained in said mixture being bleached in each successive bleaching chamber in downward direction to a higher degree than in the preceding bleaching chamber, said bleaching means having outlet means for withdrawing the bleached mixture at will from any one of said bleaching chambers, the bleaching chambers being separated by baffle partitions arranged for intimately mixing the bleaching paste with the liquid fatty material and for retarding the flow thereof; a plurality of intermittently operable filter means, each separately operable for filtering at spaced intervals batches of said bleached mixture of bleaching paste and liquid fatty material; and means for transferring from said bleaching means to said plurality of filter means in sequential order to one of said filter means after the other, batches of bleached mixture of bleaching paste and liquid fatty material, thereby enabling filtering of said bleached mixture of bleaching paste and liquid fatty material continuously delivered from said bleaching means by said intermittently operable filter means.

8. In an apparatus for continuously bleaching liquid fatty material, in combination, a plurality of intermittently operable paste forming means each separately operated for providing batches of bleaching paste at spaced time intervals; a continuously operable mixing means; means for transferring from said plurality of intermittently operable paste forming means batches of bleaching paste in sequential order from one of said paste forming means after the other in such a manner that the admission of said bleaching paste to said continuously operable mixing means is substantially continuous; means for continuously introducing into said mixing means the liquid fatty material to be bleached whereby said bleaching paste and said liquid fatty material are continuously mixed in said mixing means; continuous bleaching means connected to said mixing means for continuously receiving and bleaching the mixture of the bleaching paste and the liquid fatty material from said mixing means, said bleaching means comprising a plurality of communicating superimposed bleaching chambers each adapted to contain said mixture, the liquid fatty material contained in said mixture being bleached in each successive bleaching chamber in downward direction to a higher degree than in the preceding bleaching chamber, said bleaching means having outlet means for withdrawing the bleached mixture at will from any one of said bleaching chambers, the bleaching chambers being separated by baffle partitions arranged for intimately mixing the bleaching paste with the liquid fatty material and for retarding the flow thereof; means for producing a reduced pressure in said bleaching means; and filter means connected with said bleaching means for receiving and filtering said bleached liquid fatty material.

9. In an apparatus for continuously bleaching liquid fatty material, in combination, a plurality of intermittently operable paste forming means each separately operated for providing batches of bleaching paste at spaced time intervals; a continuously operable mixing means; means for transferring from said plurality of intermittently operable paste forming means batches of bleaching paste in sequential order from one of said paste forming means after the other in such a manner that the admission of said bleaching paste to said continuously operable mixing means is substantially continuous; means for continuously introducing into said mixing means the liquid fatty material to be bleached whereby said bleaching paste and said liquid fatty material are continuously mixed in said mixing means; continuous bleaching means connected to said mixing means for continuously receiving and bleaching the mixture of the bleaching paste and the liquid fatty material from said mixing means, said bleaching means comprising a plurality of communicating superimposed bleaching chambers each adapted to contain said mixture, the liquid fatty material contained in said mixture being bleached in each successive bleaching chamber in downward direction to a higher degree than in the preceding bleaching chamber, said bleaching means having outlet means for withdrawing the bleached mixture at will from any one of said bleaching chambers, the bleaching chambers being separated by baffle partitions arranged for intimately mixing the bleaching paste with the liquid fatty material and for retarding the flow thereof; means for producing a reduced pressure in said bleaching means; a plurality of intermittently operable filter means, each separately operable for filtering at spaced intervals batches of said bleached mixture of bleaching paste and liquid fatty material; and means for transferring from said bleaching means to said plurality of filter means in sequential order to one of said filter means after the other, batches of bleached mixture of bleaching paste and liquid fatty material, thereby enabling filtering of said bleached mixture of bleaching paste and liquid fatty material continuously delivered from said bleaching means by said intermittently operable filter means.

10. In an apparatus for continuously bleaching liquid fatty material, in combination, a plurality of intermittently operable paste forming means each separately operated for providing batches of bleaching paste at spaced time intervals, each paste forming means including a vessel in which the bleaching paste is formed and from which the bleaching paste is withdrawn for mixing with the liquid fatty material, and including indicating means for indicating the level of the bleaching paste in each vessel; a continuously operable mixing means; means for transferring from said plurality of intermittently operable paste forming means batches of bleaching paste in sequential order from one of said paste forming means after the other in such a manner that the admission of said bleaching paste to said continuously operable mixing means is substantially continuous; means for continuously introducing into said mixing means the liquid fatty material to be bleached whereby said bleaching paste and said liquid fatty material are continuously mixed in said mixing means; continuous bleaching means connected to said mixing means for continuously receiving and bleaching the mixture of the bleaching paste and the liquid fatty material from said mixing means, said bleaching means comprising a plurality of communicating superimposed bleaching chambers each adapted to contain said mixture, the liquid fatty material contained in said mixture being bleached in each successive bleaching chamber in downward direction to a higher degree than in the preceding bleaching chamber, said bleaching means having outlet means for withdrawing the bleached mixture at will from any one of said bleaching chambers, the bleaching chambers being separated by baffle partitions arranged for intimately mixing the bleaching paste with the liquid fatty material and for retarding the flow thereof; means for producing a reduced pressure in said bleaching means; a plurality of intermittently operable filter means, each separately operable for filtering at spaced intervals batches of said bleached mixture of bleaching paste and liquid fatty material; and means for transferring from said bleaching means to said plurality of filter means in sequential order to one of said filter means after the other, batches of bleached mixture of bleaching paste and liquid fatty material, thereby enabling filtering of said bleached mixture of bleaching paste and liquid fatty material continuously delivered from said bleaching means by said intermittently operable filter means.

References Cited in the file of this patent

UNITED STATES PATENTS

| | | |
|---|---|---|
| 954,889 | Schneible | Apr. 12, 1910 |
| 1,139,825 | Vandercook | May 18, 1915 |
| 1,452,173 | Scoville | Apr. 17, 1923 |
| 1,790,514 | Thurman | Jan. 27, 1931 |
| 1,845,261 | George | Feb. 16, 1932 |
| 1,891,402 | Craise et al. | Dec. 20, 1932 |
| 2,025,570 | Clark | Dec. 24, 1935 |
| 2,110,789 | Clayton et al. | Mar. 8, 1938 |
| 2,428,082 | King et al. | Sept. 30, 1947 |
| 2,441,526 | Zollinger | May 11, 1948 |
| 2,483,710 | Robinson | Oct. 4, 1949 |
| 2,505,375 | Wohlfarth | Apr. 25, 1950 |
| 2,572,971 | Bauer | Oct. 30, 1951 |
| 2,618,644 | Bailey | Nov. 18, 1952 |

FOREIGN PATENTS

| | | |
|---|---|---|
| 73,097 | Switzerland | Aug. 16, 1916 |
| 245,745 | Great Britain | Jan. 27, 1927 |